US012778853B2

(12) United States Patent
Gosenshuis et al.

(10) Patent No.: US 12,778,853 B2
(45) Date of Patent: Nov. 3, 2026

(54) TEAT AND DRINKING CONTAINER HAVING THE TEAT

(71) Applicant: KONINKLIJKE PHILIPS N.V., Eindhoven (NL)

(72) Inventors: Daan Hendrik Gosenshuis, Waalre (NL); Wiecher Ferdinand Kamping, Esch (NL); Sietse De Vries, Eindhoven (NL); Luc Berntsen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 216 days.

(21) Appl. No.: 18/265,483

(22) PCT Filed: Dec. 9, 2021

(86) PCT No.: PCT/EP2021/084922
§ 371 (c)(1),
(2) Date: Jun. 6, 2023

(87) PCT Pub. No.: WO2022/122879
PCT Pub. Date: Jun. 16, 2022

(65) Prior Publication Data

US 2024/0024204 A1 Jan. 25, 2024

(30) Foreign Application Priority Data

Dec. 11, 2020 (EP) .................................... 20213365

(51) Int. Cl.
*A61J 11/00* (2006.01)

(52) U.S. Cl.
CPC .......... *A61J 11/0015* (2013.01); *A61J 11/004* (2013.01)

(58) Field of Classification Search
CPC ...... A61J 11/0015; A61J 11/004; A61J 11/02; A61J 11/0035; A61J 11/005; A61J 9/00
USPC .......... 215/11.1–11.6, 40–55, 274, 276–277, 215/307–315, 381; 220/250, 360, 366.1; 137/14, 215; 222/490
See application file for complete search history.

(56) References Cited

U.S. PATENT DOCUMENTS 1,122,868 A * 12/1914 Davis ................ B65D 47/2031 222/571
1,825,553 A * 9/1931 Smith ................ B65D 47/2031 222/569
2,063,424 A * 12/1936 Ferguson ............. A61J 11/0015 215/11.1

(Continued)

FOREIGN PATENT DOCUMENTS

CA 2840134 A1 * 10/2012 ............ A61J 11/005
EP 1681045 A1 7/2006

(Continued)

OTHER PUBLICATIONS

International Search report and Written Opinion of PCT/EP2021/084922, dated Feb. 28, 2022.

*Primary Examiner* — Orlando E Aviles
*Assistant Examiner* — Brijesh V. Patel

(57) ABSTRACT

A teat for a drinking bottle has a nipple opening in the form of a slit arrangement. The slit arrangement has end portions which comprise curved paths. These curved paths resist tearing at the end of the slit opening, and thereby prolong the life of the teat, and thereby maintaining a uniform drinking behavior.

13 Claims, 4 Drawing Sheets

(56) References Cited

U.S. PATENT DOCUMENTS 2,223,179 A * 11/1940 Lougheed .......... A61J 11/0015 215/11.1
3,085,710 A * 4/1963 McIlory .......... A47G 19/2272 220/711
3,139,064 A * 6/1964 Harle .......... A61J 11/001 215/11.1
3,241,726 A * 3/1966 Chester .......... B65D 47/2031 222/211
3,669,323 A * 6/1972 Harker .......... B65D 47/2031 222/490
3,718,140 A * 2/1973 Yamauchi .......... A61J 11/008 215/11.1
3,797,696 A * 3/1974 Dibrell .......... B65D 47/2018 222/511
4,133,457 A * 1/1979 Klassen .......... B65D 47/2031 137/849
4,350,260 A * 9/1982 Prueher .......... B65D 47/2018 220/268
4,356,935 A * 11/1982 Kamin .......... B65D 25/42 222/327
5,117,994 A * 6/1992 Leblanc .......... A61J 11/0015 215/11.1
5,330,437 A * 7/1994 Durman .......... A61M 39/06 604/167.04
5,573,507 A * 11/1996 Moser .......... A47G 21/18 215/11.1
5,769,285 A * 6/1998 Upham .......... A01K 9/005 215/11.1
5,784,999 A * 7/1998 Larson .......... A61J 11/045 215/11.5
5,797,505 A * 8/1998 Kaura .......... A61J 11/045 215/11.1
7,147,121 B2 * 12/2006 Boucher .......... A47G 19/2272 220/717
8,720,712 B1 * 5/2014 Faber .......... A61J 9/001 215/11.3
8,833,575 B2 * 9/2014 Fave-Lesage .......... A61J 11/004 215/11.4
9,492,358 B2 * 11/2016 Lee .......... A61J 9/04
9,750,664 B2 * 9/2017 Palmer .......... A61J 11/04
2006/0011571 A1 * 1/2006 Silver .......... A61J 11/045 215/11.1
2006/0060551 A1 * 3/2006 Hong .......... A61J 11/0065 215/11.1
2007/0102388 A1 * 5/2007 Lewis .......... A61J 11/02 215/11.1
2010/0163508 A1 * 7/2010 Samson .......... A61J 11/002 215/11.5
2010/0200530 A1 * 8/2010 Terwilleger .......... A01K 9/005 215/11.1
2015/0164748 A1 * 6/2015 Brown .......... A61J 11/0015 215/11.5
2016/0199262 A1 7/2016 Itzek
2023/0083291 A1 3/2023 Kamping et al.

FOREIGN PATENT DOCUMENTS

EP 3865109 A1 * 8/2011 .......... A61J 11/0015
FR 2833829 A1 6/2003
JP S6028443 Y2 * 8/1985
JP S6028444 Y2 * 8/1985
JP 2003144529 A * 5/2003

* cited by examiner

TEAT AND DRINKING CONTAINER HAVING THE TEAT

CROSS-REFERENCE TO PRIOR APPLICATIONS

This application is the U.S. National Phase application under 35 U.S.C. § 371 of International Application No. PCT/EP2021/084922, filed on Dec. 9, 2021, which claims the benefit of European Patent Application No. 20213365.8, filed on Dec. 11, 2020. These applications are hereby incorporated by reference herein.

FIELD OF THE INVENTION

This invention relates to teats for drinking bottles, for example for milk feeding bottles for infants.

BACKGROUND OF THE INVENTION

Infant feeding bottles are used by parents to feed babies breast milk or formula milk when breast feeding is not possible, or as an alternative or supplement to breast feeding. Typically, baby bottles have a soft flexible teat that mimics a breast shape and physical behavior. Teat are typically formed as injection molded silicone components.

The teat has an opening at the tip, through which the infant drinks. It is also very common to have an air venting valve to allow air to enter the bottle when milk is drunk from the bottle. This is provided so that the baby can continuously drink without the need to release the bottle.

The opening at the top is typically formed by a hole or slit. In the case of a slit, it is formed as a small cut through the material of the teat, and it can be created in a variety of ways. The cut means there is a physical opening in the silicone, but no permanent large opening. Slits are usually created using a separate process step after the molding of the teat. Thus, the silicone teats are first created such as by an injection molding process, and the slit is then formed by driving a knife through the teat tip. This cutting can either be done freely or with a sort of punching method with a counter surface.

The slit design can be a simple line shape, or a Y-shape or an X-cross cut or any other variety of lines that usually meet in a center. Other shapes, such as a T-shaped slit, are also possible. It is also possible that multiple smaller slits are used to create the right flow rate for the baby. Typically the length, shape or number of slits determines the flow rate of the teat. This flow rate could vary per baby or per drinking session depending on the amount of suction, amount of tongue compression that the baby applies and the orientation of the teat.

It is important that the baby can drink from a teat with the right flow rate. If the flow rate of the teat is too high, the baby could choke in the milk, typically leading to milk leaking out of the baby's mouth. This uncontrolled drinking could lead to subsequent unwanted effects, like reflux, a lot of burping, or gas forming in the baby's stomach.

A too slow flow rate can lead to the baby needing to perform too much effort to obtain the required amount of milk from the bottle. Typically, baby bottle brands offer a wide range of different flow rates (with different numbers of holes or slit sizes) to accommodate all kinds of different babies and different types of milk or even other drinks (e.g. thickened liquids).

The benefit of a slit over a more conventional large drinking orifice is that drinking orifices always have an large initial opening. These initial openings leak out milk without the need for applying suction. This could be inconvenient when a consumer wishes take the bottle on the go, and milk leaks out. However, the main benefit of a slit design is that a permanently open large orifice can have a negative effect on drinking behavior.

A large permanent opening makes it easier for a baby to drink. Milk already starts flowing without the need of a proper latch-on or suction from the baby. The problem with the drinking process being too easy for the baby is that the baby may not want to go back to the breast, which is unwanted when a mother wants to both breast feed and bottle feed. The use of a slit thus better mimics breastfeeding. Indeed, it is known to deliberately increase the opening pressure of the valve created by the slit to better mimic breast feeding.

A problem with a slit opening is that it can tear further open. This means that the original slit, intended with a certain design and length to create a certain flow rate, will become longer, leading to a change in this flow rate. Testing by the inventors has shown that this tearing problem can arise very quickly, sometimes already after a single feed of a baby.

During an average feed, a baby typically applies 80 sucks per minute. For a feed of 20 minutes, 1600 sucks are applied. Given that a baby will sometimes compress the teat to an almost flat configuration, these 1600 compressions have been found to already induce an unwanted tearing of the slit.

There is therefore a need for an improved teat design which has improved resistance to wear, in particular tearing.

EP 1 681 045 discloses various teat designs with different slit shapes, including curved slits. One example has a S-shape.

JP 2003/144529 and FR 2 833 829 each disclose various teat designs with different slit shapes, for example having circular openings at the ends of linear slits.

US 20116/199262 discloses various teat designs with different slit shapes, including curved slits. One example has curved T-pieces at opposite ends of a curved slit.

SUMMARY OF THE INVENTION

The invention is defined by the claims.

According to examples in accordance with an aspect of the invention, there is provided a teat for a drinking bottle, comprising

- a nipple portion located at one end of a teat axis; and
- a nipple opening located in the nipple portion,
- wherein the nipple opening comprises a slit arrangement comprising at least one slit, the slit arrangement having end points each terminating a respective end portion, wherein at least one end portion forms a curved path.

The slit arrangement has a straighter section before each end portion, the straighter section having a length equal at least to said minimum radius of curvature and the straighter section having a second minimum radius of curvature at least 2 times the first minimum radius of curvature.

There is a smooth transition from the straighter section to the end portion. Thus, there are no gradient discontinuities between the straighter section and the end portion.

The curved path forms an open shape. By "forming an open shape" is meant the curved path does not meet itself, which would thereby create a hole.

The end point of a slit is where the slit ends. The slit arrangement may for example comprise a single slit with two opposite end points, and both end points may then be at the end of a curved path, each curved path forming a respective end portion. The straighter sections then form a connecting portion between those end portions.

Instead, there may be multiple slits which interconnect, for example in a star configuration. In such a case, all the end portions are at radially outward positions, and the center of the star is at a radially inward position, with the straighter section between the center and each end portion. The end points are for example locations which (in the absence of the curved path) could tear radially outwardly. The actual extreme end of a slit may not actually face radially outwardly, since for example the curved path may result in a 180 degree bend so that extreme end actually faces radially inwardly. However, the end portion is still an outward end portion in that it has a general location which is displaced outwardly from the center.

The curved path or paths resist tearing at the end of the slit opening, and thereby prolong the life of the teat, and thereby maintaining a uniform drinking behavior.

When there are multiple slits, the slit arrangement preferably comprises only one interconnected set of slits. However, there may multiple separate slits, for example each having a design with one or more curved end portions.

The slit extends fully through the material of the teat.

Each curved path may comprise a curved line which follows at least a 90 degree path. It may follow at least a 180 degree path so that the curve follows at least a U-turn.

A connecting portion (formed by the straighter sections) is for example continuous with the end portion, in that the connecting portion merges with the curved path, so that the curved path is a continuation of a connecting portion with no abrupt angle changes. For example the radius of curvature of the curved path is the tightest radius within the slit arrangement.

Each curved path may comprise a curved line which follows at least a 225 degree path. The curved path may follow a 270 degree path.

In another arrangement, the each curved path comprises a curved line which follows a spiral path of at least 360 degrees.

In another arrangement, each curved path comprises a curved line which connects to the end of a connecting portion with a T-junction. Thus, in this case, the curved path may be considered to form a head at the end of a connecting portion, extending across the end of a connecting portion, for example locally at 90 degrees.

Thus, there are various possible slit arrangement designs.

In all possible designs of the curved end portions, the slit arrangement may have two end portions. Thus, there is a generally linear slit, with curved ends.

The slit arrangement may instead have three connecting portions which meet at a center. This gives a Y-shaped slit arrangement, for example with 120 degrees between the three connecting portions. The slit arrangement may instead have three connecting portions which meet at a T junction.

In further designs, the slit arrangement may have a number N of end portions and a number N of connecting portions which meet at a center, where N is four or more.

In all designs above, the connecting portions may be straight. This makes the tooling for the creating the connecting portions as simple as possible. They may however have a curvature as well, although typically with a larger radius of curvature than the end portions.

The slit arrangement may have has a uniform slit width. This simplifies manufacture, for example making use of a uniform thickness shaped cutting knife. The uniform slit width may for example 100 μm or less.

There may however also be a small opening within the slit arrangement, for example located at a connecting portion. The opening may itself have a diameter of 100 μm or less.

The radius of curvature of the curved paths may be in the range 0.05 to 0.4 mm.

The teat for example comprises an integral silicone component. It may have a wall thickness in the range 0.5 mm to 0.9 mm.

The slit arrangement for example fits in a smallest circle of diameter in the range 1 mm to 5 mm. The slit arrangement may be rotationally symmetric.

The invention also provides a feeding bottle comprising:

a container; and the teat as defined above.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
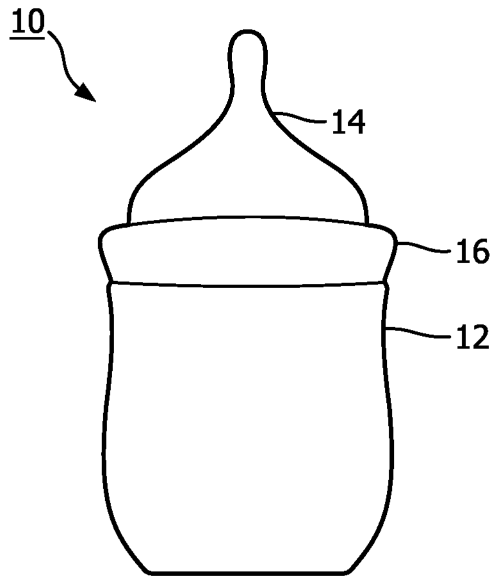
FIG. 1 PRIOR ART
FIG. 1 shows a typical drinking bottle.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a teat for a drinking bottle having a nipple opening in the form of a slit arrangement. The slit arrangement has end portions which comprise curved paths. These curved paths resist tearing.

FIG. 1 shows a typical drinking bottle for bottle feeding a baby or infant using a teat. The drinking bottle 10 comprises a container 12, a teat 14 and a connection ring 16 which secures the teat 14 to the container. The connection ring for example screws over a thread at the top of the container. The teat closes the container top opening.

Figure 2:
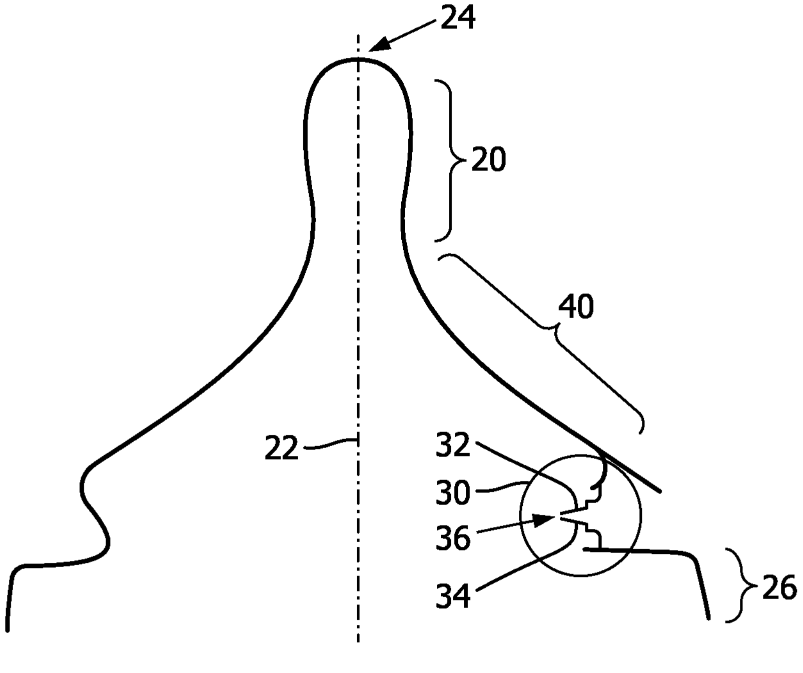
FIG. 2 PRIOR ART
FIG. 2 shows an example of a known teat.

FIG. 2 shows an example of a known teat 14.

The teat 14 has an upper nipple portion 20 located at one end of a teat axis 22 and a nipple opening 24 at an upper end of the upper nipple portion 20. The nipple opening may be at the very end of the nipple portion as shown, but it may instead be recessed back from the very top of the nipple portion. It is shown in a central location, but it could equally be offset to one side.

A base rim portion 26 is located at an opposite end of the teat axis for seating against an opening of the container 12.

Note that the top or upper parts are defined as those nearest the nipple and the bottom, base or lower parts are defined as those nearest the rim. These terms are simply used for convenience and do not imply any particular orientation (with respect to the direction of gravity).

In the example shown, the teat has a duck bill valve 30 formed between the upper nipple portion 20 and the base rim portion 26.

The valve has a first valve flap 32 and a second valve flap 34 which define between them a valve slit opening 36.

There is a skirt portion 40 below the upper nipple portion 20. This provides a gradual widening from the desired nipple size e.g. around 10 mm diameter, to the desired container size, e.g. 40 mm diameter. It mimics the shape of a breast.

The teat is generally rotationally symmetric, i.e. other than the valve 30. It may be generally circular but it may also be non-circular.

The teat 14 is injection molded, using the nipple opening 24 as the liquid entry and air escape point.

This invention relates specifically to the nipple opening, and in particular a nipple opening in the form of a slit arrangement.

A problem with a slit opening is that the ends of the slit can tear with use of the teat.

Figure 3:
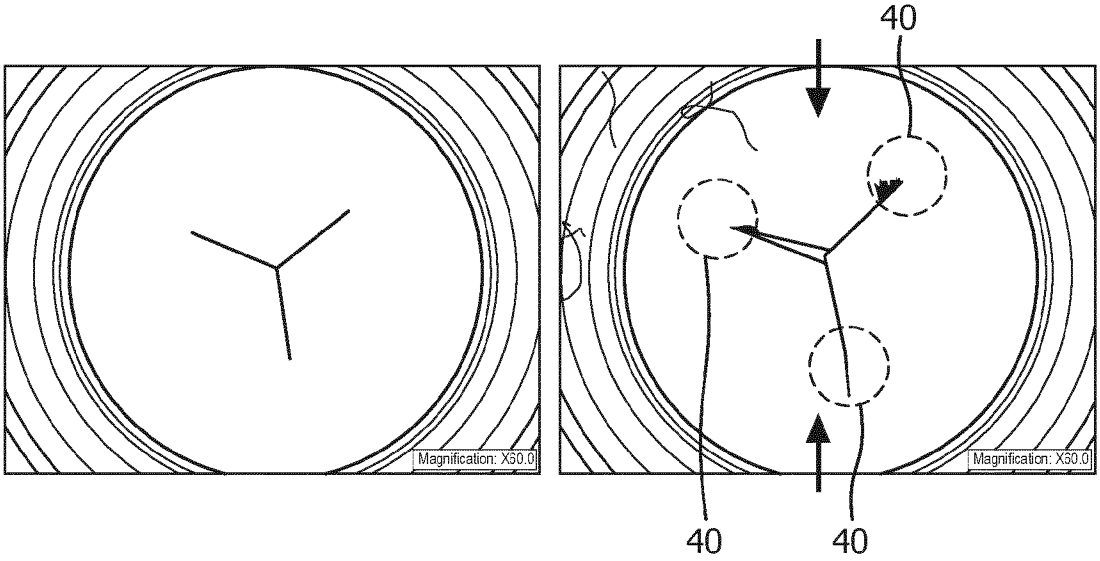
FIG. 3 shows images of a newly formed Y-shaped slit and after compression 2000 times in a controlled test set up.

FIG. 3 shows images of a Y-shaped slit arrangement, i.e. a slit arrangement of three linear slits 120 degrees apart from each other around at a center point. The left image shows the newly formed slit arrangement and the right image shows the slit arrangement after compression 2000 times in a controlled test set up.

The compression direction is represented by the arrows. Slit tearing can be seen in the skirt portion 40. Similar tearing behavior is seen in returned teats from a user test. The result of the tearing is a significant flow rate increase.

The inventors have determined that the tearing happens due to the amount of compression, potentially in combination with the vacuum forces. In particular, the analysis of the inventors has shown that stresses resulting from the teat compression are highest at the ends of the slit, especially when the compression direction is aligned with the slit direction. For this reason, the tearing shown in FIG. 3 is most pronounced for the downwardly directed slit leg.

The invention makes use of rounded slit ends, and they are found to reduce the peak stresses arising at the slit ends.

Figure 4:
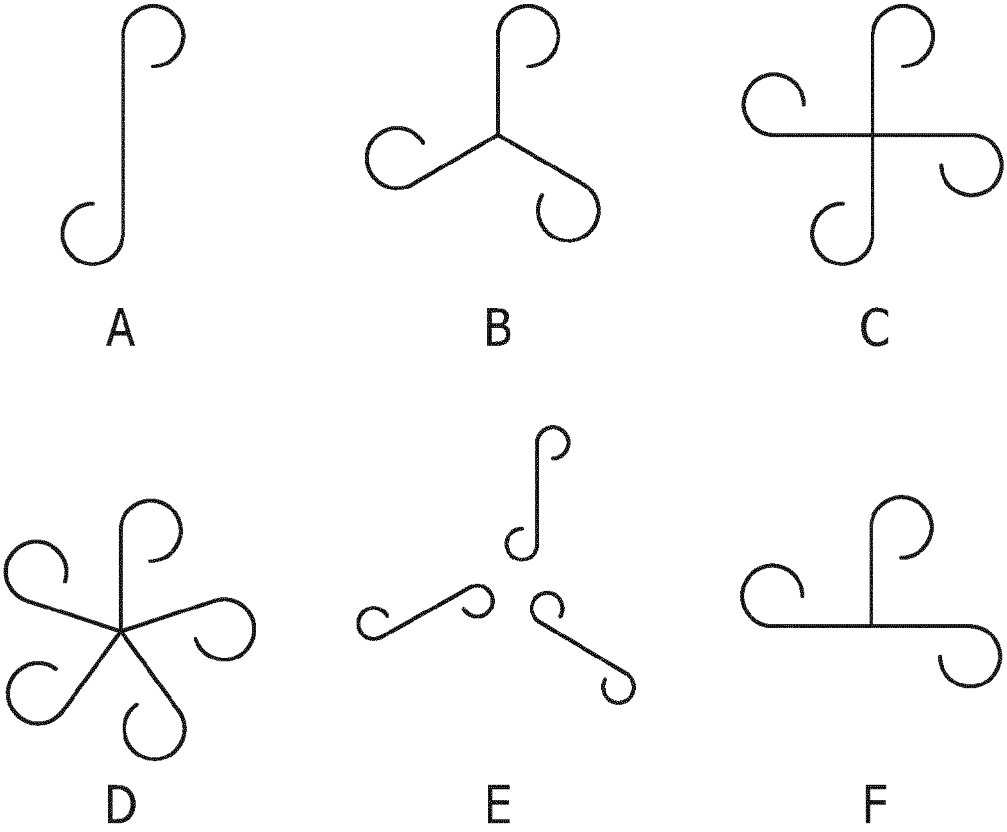
FIG. 4 shows a first set of examples of modified design for the slit arrangement.

FIG. 4 shows a first set of examples of modified design for the slit arrangement.

In each design, there is a straight part or multiple straight parts, which may be considered to be connecting portions which connect end portions. More generally, the straight part is a straighter section than the end portion. Furthermore, there is a smooth transition from the straighter section to the end portion. For example, the tangential direction at the end of the straighter section is the same as the tangential direction at the start of the end portion.

The connecting portions together form a conventional slit arrangement configuration, and the end portions may be considered to be the modified design parts of the slit arrangement. The connecting portions are all straight lines in the examples of FIG. 4, but they could equally have a curvature, although the curvature of the end portions is tighter.

The curved paths have a first minimum radius of curvature. The examples of FIG. 4 shows circular arcs as the end portions, hence they have a single radius of curvature. However, each end portion may have multiple radii of curvature (e.g. the spiral of FIG. 5G).

Each end portion connects to a respective straighter section having a length equal at least to said minimum radius of curvature. Thus, there is a straighter section which performs the main valve slit function. The length of each straighter section may be equal to at least two or at least three times the minimum radius of curvature.

The straighter section has a second minimum radius of curvature at least 2 times, or at least 3 times, the first minimum radius of curvature.

FIG. 4A shows a linear slit, wherein each end is curved around by 270 degrees, with a constant radius of curvature (i.e. equal to the minimum radius of curvature). The two ends both curve in a clockwise direction, so that the slit arrangement has rotational symmetry (of order 2). There is thus one connecting portion and two end portions. The connection portion may be considered to comprise two straighter sections; one preceding each end portion.

FIG. 4B shows a Y-shaped slit (i.e. a 3 arm star shape), wherein each end is curved around by 270 degrees, with a constant radius of curvature. The three ends all curve in a clockwise direction, so that the slit arrangement has rotational symmetry (of order 3). There are thus three connecting portions and three end portions.

FIG. 4C shows a slit arrangement with four connecting portions and four end portions (i.e. a 4 arm star shape). Each end is again curved around by 270 degrees, with a constant radius of curvature. The four ends all curve in a clockwise direction, so that the slit arrangement has rotational symmetry (of order 4).

FIG. 4D shows a slit arrangement with five connecting portions and five end portions. Each end is again curved around by 270 degrees, with a constant radius of curvature. The give ends all curve in a clockwise direction, so that the slit arrangement has rotational symmetry (of order 5).

FIG. 4E shows a slit arrangement with three separate slits, each of the type shown in FIG. 4A. They are oriented in a radial direction from a center, and arranged at 120 degrees to each other around that center. The overall slit arrangement is thus again rotationally symmetric (with order 3) but is formed by separate linear slits.

Each slit has an inward end portion and an outward end portion. In the example shown, both the inward end portions and the outward end portions have the curved shape. However, it is primarily important to prevent tearing outwardly (hence increasing outer size of the slit). Thus, the outward end portions have the curved end shapes, but the inward end portions may terminate as the end of a straight line.

FIG. 4F shows a slit arrangement with three connecting portions but forming a T-shape. Each end is again curved around by 270 degrees, with a constant radius of curvature. The three ends all curve in a clockwise direction. This example shows that overall rotational symmetry is not essential.

There may be more connecting portions and end portions, but the design may then become challenging from a manufacturing perspective.

The examples of FIG. 4 all have the same shape of the end portions. They also all have curvature in the same sense. However, different end portions may curve in different senses.

The curved path at the end of each slit forms an open shape. In most examples, the curved path extends around more than 180 degrees. The curved path is continuous with the connecting portion, i.e. wherein the connecting portion joins to the start of the curved end portion, there is no discontinuity in the direction, so that at the junction both have the same direction/tangential direction.

Although the curved end portions have tighter curvature than the straighter sections, the curved end portions do form a significant part of the slit shape. For example if the maximum slit width (e.g. from the top to bottom for the design of FIG. 4A) is W, the size (e.g. effective diameter) of the curved path may be between 0.15 W and 0.35 W. Thus, the curved path is not a very tight curve and the curved paths form a significant part of the overall slit width. The effective diameter may be assumed to be the maximum linear dimension of the (space occupied by the) curved path, for the case of a non-circular curvature.

Figure 5:
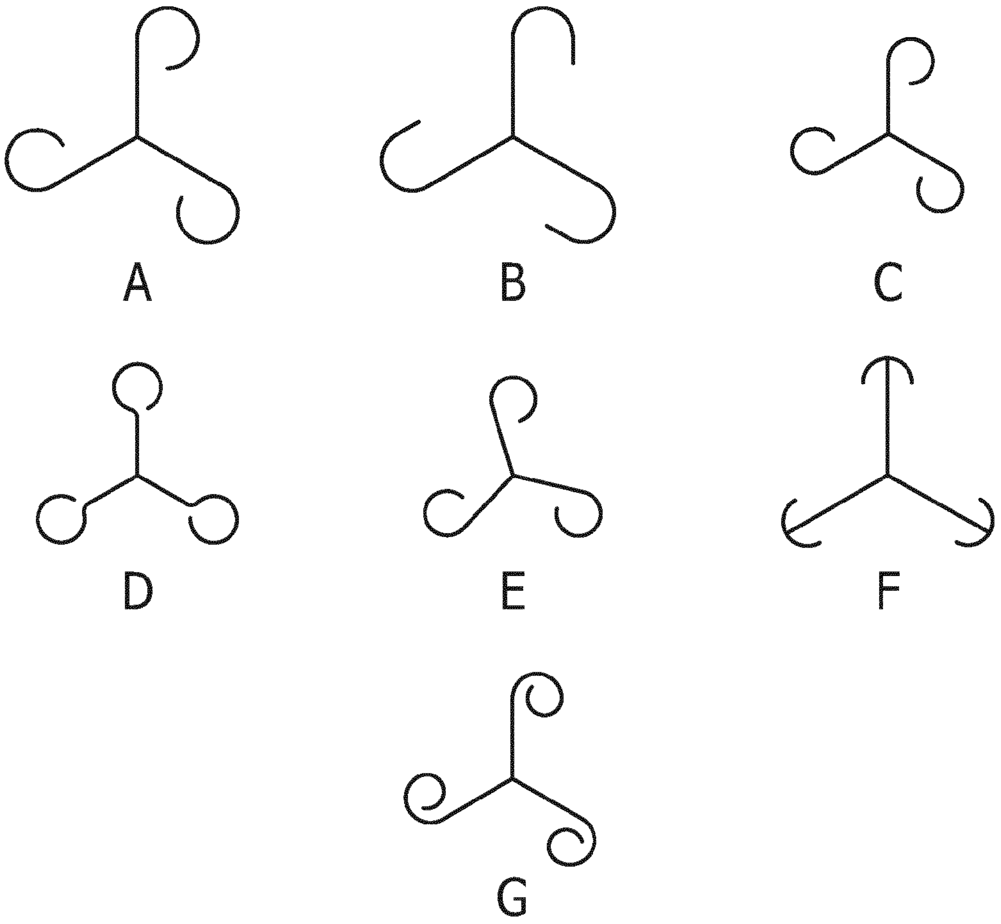
FIG. 5 shows alternative shape designs for the end portions, applied to a Y-shaped slit arrangement.

FIG. 5 shows alternative shape designs for the end portions, applied to the Y-shaped version of FIG. 4B.

FIG. 5A corresponds to FIG. 4B, and thus shows end portions with a 270 degrees curve.

FIG. 5B shows a 180 degree curve.

FIG. 5C shows that different radii of curvature of the end portions are possible in different examples. The radius of curvature of FIG. 5C is less than for FIG. 5A despite the same overall size of the slit arrangement.

In the examples of FIGS. 5A to 5C, the curved path of each end portion is continuous with the connecting portion, with a smooth transition from the connecting portion to the end portion and with curvature in one rotation only. FIG. 5D shows that the curved path may have a curvature in one direction (e.g. anticlockwise) before the curvature of the curved end portion in an opposite direction (e.g. clockwise). This forms an eye shape. The eye shape must not be closed, in order to prevent cutting out the complete hole (which would then lose the no-drip functionality). There is still a smooth transition from the straighter section to the end portion, in that there are no discontinuities.

FIG. 5E shows a curved path between 180 degrees and 270 degrees, for example of 230 degrees.

FIG. 5F shows an alternative design in which the curved path of each end portion is no longer continuous with the connecting portion. This design is not within the scope of the claims. Instead, the end portion forms a head extending across the end of the connecting portion, thereby forming a T-junction. The head is curved and each head has two curved ends.

FIG. 5G shows a spiral shape to the end portion, namely a curve with progressively decreasing radius of curvature and extending around at least 360 degrees.

The example of FIG. 5 all have a curve at the end portion which curves in one direction only (e.g. a J-shape or a U-shape). However, an individual end portion may also curve in multiple directions (e.g. an S-shape).

Figure 6:
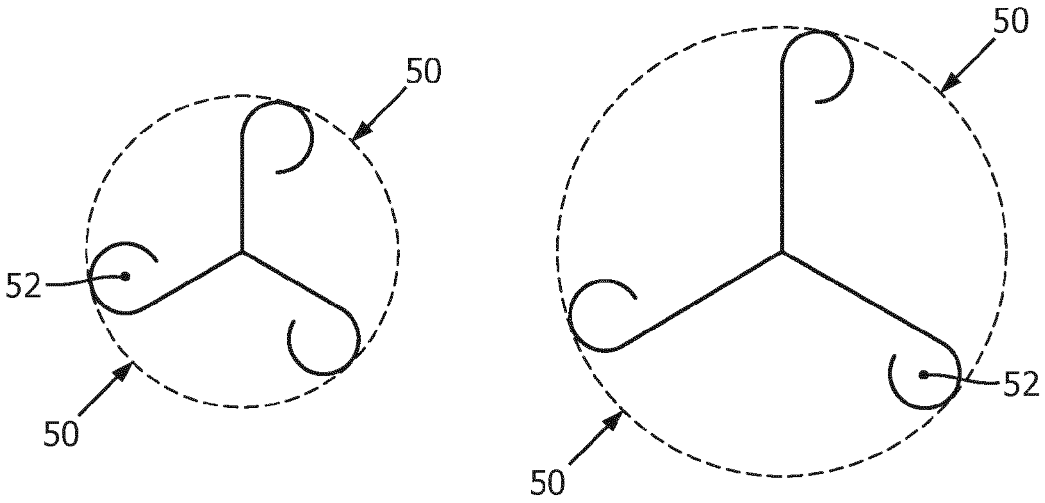
FIG. 6 shows two possible preferred designs.

FIG. 6 shows two possible preferred designs. A Y-shaped slit arrangement is chosen since this design is symmetrical (when compressing the teat) every 60 degrees, which is beneficial over a cross slit that is only symmetrical every 90 degrees.

The symmetry helps to keep the flow rate as equal as possible to the baby independent of orientation. However, more than 4 slit legs may be challenging from a manufacturing point of view, so a Y-shaped slit arrangement is one preferred option.

The total diameter of the slit (i.e. the diameter of the circle 50 within which the slit arrangement fits) may be in the range 1.2 mm (the left image of FIG. 6) up to 5.0 mm (the right image in FIG. 6) for example with a size for a lowest flow teat close to 1.5 mm and a size for a highest flow teat close to 3.4 mm. The high flow rate teat offers a solution for feeding thicker liquids.

The curved end portion 52 is in these examples starts in a tangential direction to the slit line (thus there is a smooth transition with no kink) and the radius of curvature is for example in the range mm to 0.4 mm dependent on the wall thickness of the teat through which the slit arrangement extends. The wall thickness is for example in the range from 0.5 to 0.9 mm. An example of a preferred radius of curvature is about 0.2 mm to prevent peak stresses at the slit end.

The overall slit arrangement for example fits in a smallest circle of diameter in the range 1 mm to 5 mm, i.e. it has a largest lateral dimension in the range 1 mm to 5 mm.

The slit arrangement preferably has a maximum slit width of 100 μm in a rest state. There may be a uniform slit width with this slit width. However, there may instead be a small opening along a slit, for example located in the center of the slit arrangement. The remainder of the slit may have a narrower width.

The slit width may be zero in a rest state. When there is a small opening, it may be the only part of the slit which does not close in the rest state.

It has been found that preferred shapes for the curved end portions include a curve of at least 180 degrees, and preferably more than 180 degrees. An example is for example a range of 200 to 250 degrees. The maximum 250 degree curve prevents the end point of the curved path being too close to the connecting portion which it is approaching.

The curved end portions may be formed by a correspondingly shaped knife. Of course, the slit arrangement could instead be created in a 2-step cutting approach (with straight cuts and curved cuts separated), but this may be more complex to manufacture.

Figure 7:
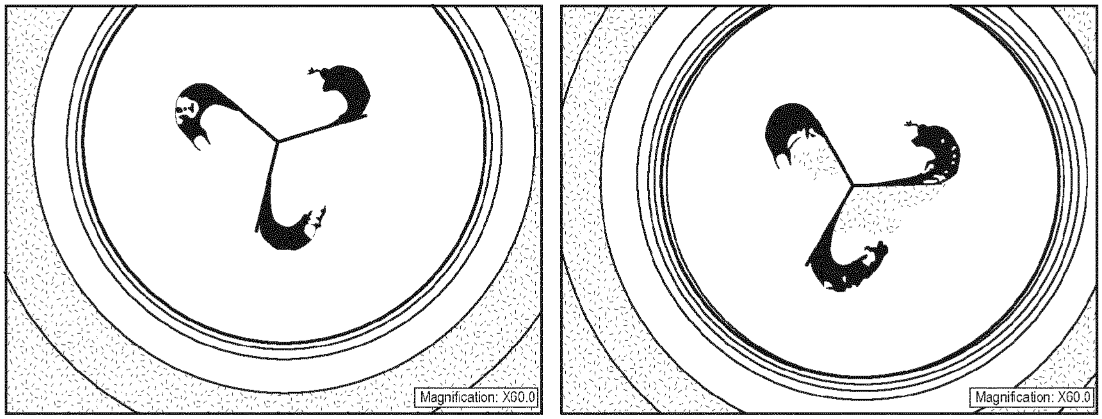
FIG. 7 shows images of a newly formed Y-shaped slit with curved ends and after 200,000 compression cycles.

FIG. 7 shows images of a Y-shaped slit, i.e. a slit arrangement of three linear slits 120 degrees apart from each other meeting at a center point, with the curved end portions. The left image shows the newly formed slit arrangement and the right image shows the slit arrangement after 200,000 compression cycles.

Because the compression stresses are now spread over the entire curvature of the slit arrangement, the tear resistance is improved, and indeed no tearing is present in the right image.

The teat may be used in a feeding bottle or drinking cup. The invention thus also provides a feeding bottle comprising a container and the teat described above.

The slit arrangement is for example formed in a surface which is not planar, for example in a domed shape.

The teat itself may have a constant wall thickness, but there may instead be a different (e.g. reduced) wall thickness of the teat where the slit arrangement resides.

In addition, a portion of thicker teat material may also provide resistance to tearing. For example, one outward end of a slit may have a curved shape as described above, and the inward end may terminate as an end of a straight line, but there may then be a thicker portion of the teat material to prevent tearing.

A portion of thicker teat material may also be at the end of a curved end portion, so that both the curvature and the thicker teat material serve to resist tearing.

The slit arrangement may be formed perpendicularly through the material of the teat, but it may instead be formed as an angled cut through the material of the teat.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A teat for a drinking bottle, comprising:

a nipple portion located at one end of a teat axis; and a nipple opening located in the nipple portion, wherein the nipple opening comprises a slit arrangement comprising at least one slit, the slit arrangement having a connecting portion terminating in at least one end portion, wherein the at least one end portion forms a curved path having a first minimum radius of curvature and forming an open shape, wherein the connecting portion having one of a radius of curvature greater than the radius of curvature of the at least one end portion or an infinite radius of curvature, with a smooth transition from the connecting portion to the at least one end portion, the connecting portion having a length equal at least to said first minimum radius of curvature and the connecting portion having a second minimum radius of curvature at least 2 times the first minimum radius of curvature.

2. The teat of claim 1, wherein each curved path comprises a curved line which follows one of at least a 90 degree path, at least a 180 degree path, and at least a 225 degree path.

3. The teat of claim 1, wherein each curved path comprises a curved line which follows a spiral path of at least 360 degrees.

4. The teat of claim 1, wherein the connecting portion has terminates in two end portions.

5. The teat of claim 1, wherein the slit arrangement has a second connecting portion and a third connecting portion and wherein the connecting portion, second and third connecting portions meet at a center.

6. The teat of claim 1, wherein the connecting portion, second and third connecting portions meet at a T junction.

7. The teat of claim 1, wherein the slit arrangement has a number N of end portions and a number N of connecting portions which meet at a center, where N is four or more.

8. The teat of claim 1, wherein the connecting portion is straight.

9. The teat of claim 1, wherein the slit arrangement has a uniform slit width.

10. The teat of claim 1, wherein the radius of curvature of the curved path is in the range 0.05 to 0.4 mm.

11. The teat of claim 1, comprising an integral silicone component.

12. The teat of claim 1, wherein the slit arrangement fits in a smallest circle of diameter in the range 1 mm to 5 mm.

13. A feeding bottle comprising:

a container; and the teat of claim 1.

* * * * *